Dec. 8, 1931. T. A. BOTH 1,835,554
ELECTRIC RECEPTACLE
Filed Dec. 4, 1922   2 Sheets-Sheet 1
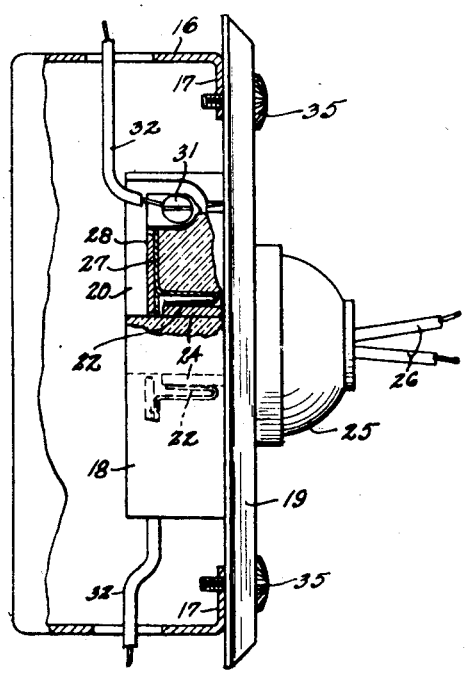
Fig. 1.
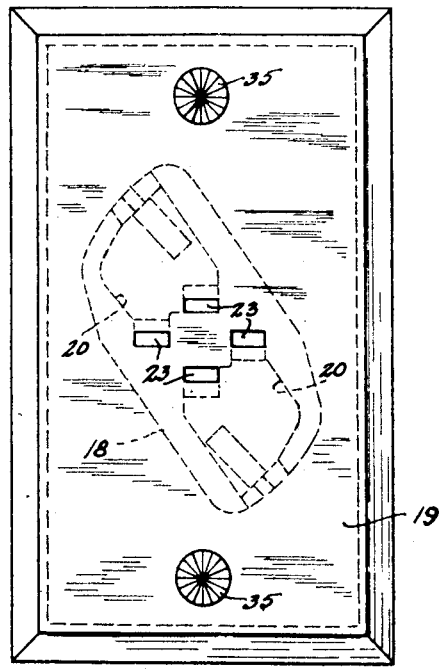
Fig. 2.
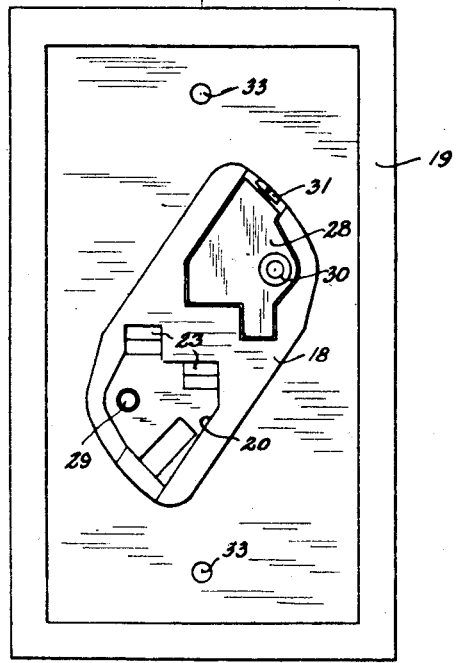
Fig. 3.
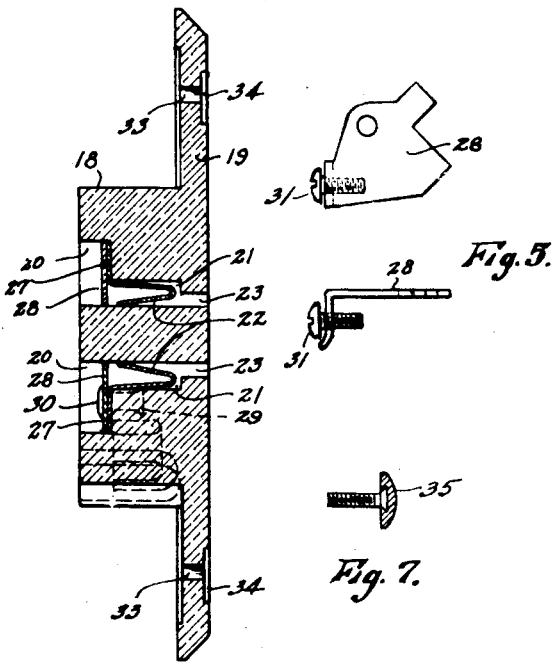
Fig. 4.   Fig. 5.   Fig. 7.
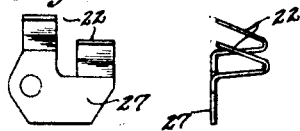
Fig. 6.
INVENTOR
Tonjes A. Both
BY
Wooster & Davis
ATTORNEYS.

Dec. 8, 1931.    T. A. BOTH    1,835,554
ELECTRIC RECEPTACLE
Filed Dec. 4, 1922    2 Sheets-Sheet 2
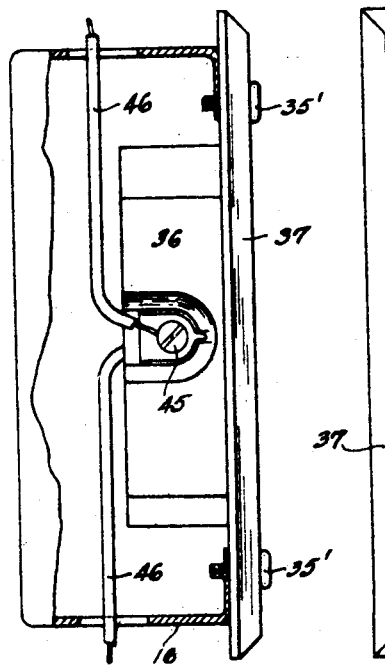
Fig. 8.
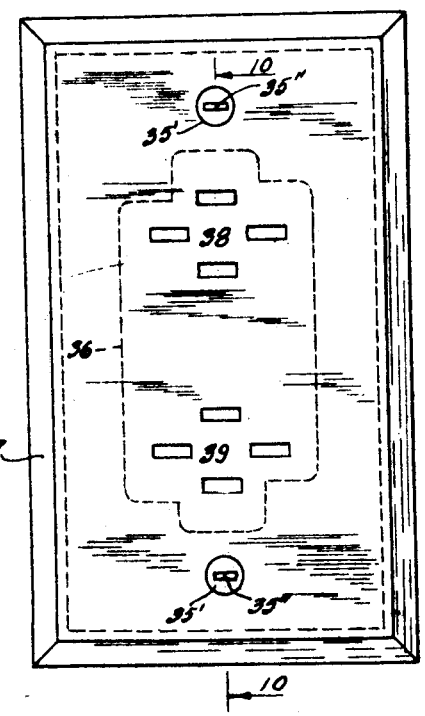
Fig. 9.
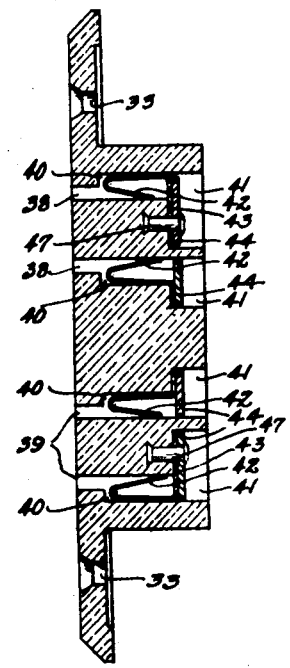
Fig. 10.
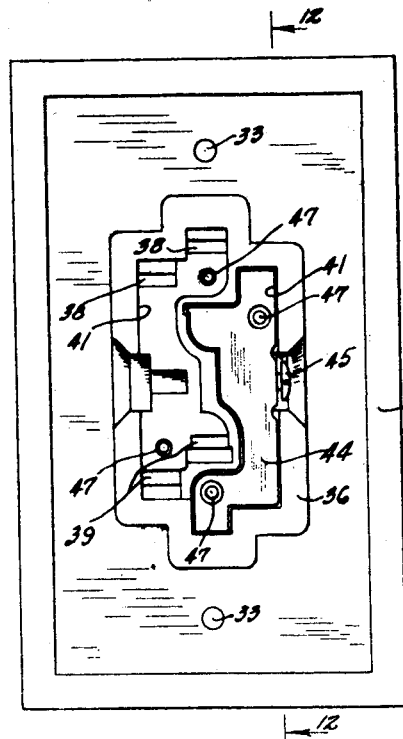
Fig. 11.
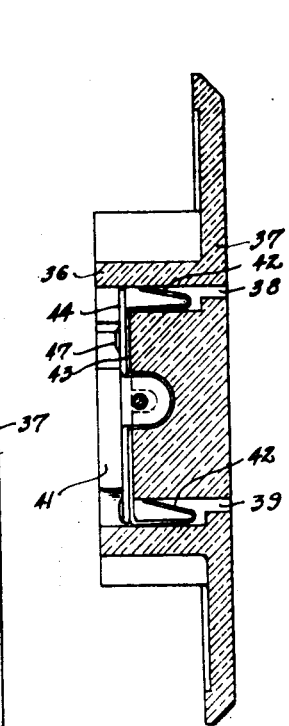
Fig. 12.
Fig. 15.
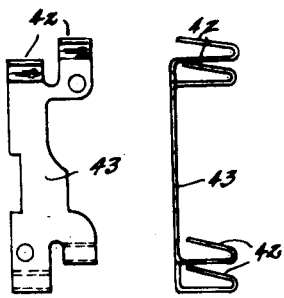
Fig. 13.
Fig. 14.
INVENTOR
Touyes A. Both
BY
Wooster & Davis
ATTORNEYS.

Patented Dec. 8, 1931

1,835,554

UNITED STATES PATENT OFFICE

TONJES A. BOTH, OF STRATFORD, CONNECTICUT, ASSIGNOR TO THE CONNECTICUT ELECTRIC MANUFACTURING COMPANY, OF BRIDGEPORT, CONNECTICUT, A CORPORATION OF CONNECTICUT

ELECTRIC RECEPTACLE

Application filed December 4, 1922. Serial No. 604,694.

This invention relates to electrical devices such as switches and receptacles, though I have illustrated it as applied to a receptacle, and it is an object of the invention to provide devices of this type which will be absolutely safe, so that there will be no danger to the operator should the connections to the device within the outlet box in which it is mounted become loosened, or should anything go wrong with the device or the connections therewith.

It is also an object of the invention to provide a receptacle or the like which is much simpler in construction and comprises a much smaller number of parts than those now generally in use.

It is a further object of the invention to provide a receptacle or like device which will be easier to install in the outlet box than are those now employed.

It is a still further object of the invention to provide a device of this type which will be neat and attractive in appearance and which may be easily cleaned.

With these and other objects in view I have devised the construction illustrated in the accompanying drawings, in which Fig. 1 is a partial sectional view and a partial side elevation of an outlet box showing one of my improved receptacles applied thereto.

Fig. 2 is a front view of the same.

Fig. 3 is a rear view of the receptacle.

Fig. 4 is a longitudinal section, substantially on line 4—4 of Fig. 3.

Fig. 5 shows a plan and edge view of the plate carrying a binding post.

Fig. 6 shows a plan view and a side view of the contact plate.

Fig. 7 is a sectional view of one form of securing means.

Fig. 8 is a view similar to Fig. 1, showing a double receptacle.

Fig. 9 is a front view of the receptacle shown in Fig. 8.

Fig. 10 is a longitudinal section of the same, substantially on line 10—10 of Fig. 9.

Fig. 11 is a rear view of the receptacle, showing, however, one of the contact plates and the securing plate therefor removed.

Fig. 12 is a longitudinal section substantially on line 12—12 of Fig. 11.

Fig. 13 comprises a plan and edge view of the plate carrying the binding posts.

Fig. 14 comprises a plan and edge view of the spring contact plates, and

Fig. 15 is a section through another form of securing means.

Referring first to the form of the device shown in Figs. 1 to 7, 16 indicates the outlet box adapted to be mounted in a recess in a wall in the usual manner and having the usual ears 17 to receive the securing screws for the face plate. The front side of this box is open for the insertion of the electrical device, such as a switch or a receptacle which is to be mounted in the box.

The receptacle illustrated comprises a body portion 18 and a face plate portion 19 of insulating material and molded in one piece. This makes a very neat and simple device but if desired the body portion and the face plate portion may be made separate and secured together by suitable means without destroying the safety and other advantageous features of the device. The material employed is preferably a phenolic condensation product such as condensite, bakelite, redmanol or the like, as it may be molded without difficulty to the forms desired, is a non-conductor of electricity, may be finished in different surfaces, colors and appearances, and may be easily cleaned. The body portion 18 is adapted to carry the contacts, and in the present instance it is provided with recesses 20 leading from the rear wall thereof and chambers 21 communicating with these recesses in which the spring contact blades 22 are mounted. Leading from the front of the face plate portion 19 are suitable openings 23 connecting with the chambers 21, and are adapted for the insertion of the contact blades 24 carried by a standard cap 25, these blades being connected with the lead wires 26 in the usual manner. The two contact plates are alike, comprising the body portion 27 and the two laterally bent spring contact fingers or blades 22. When placed in position the body portion 27 rests on the bottom wall of the recess 20 with the spring blades or fingers extending into the chambers 21. Placed over this body portion is a securing plate 28 held in the securing position by means of a rivet 29 molded in the body portion, extending through openings in the contact and securing plates 27 and 28 and riveted over on the outer wall thereof, as shown at 30. This arrangement securely fastens the plates 27 and 28 together, forms good electrical contact between them and also secures them to the body portion 18 of the receptacle. Carried by the securing plates 28 are the binding post screws 31 to which the lead wires 32 may be connected in the usual manner. The receptacle may be secured to the outlet box by the usual face plate screws, if desired, but I prefer to employ an electrically non-conducting securing means such as a screw made of insulating material or a screw which has a head of insulating material, as shown in Figs. 7 and 15. These screws have a body portion 33 threaded to engage with the threaded opening in the ears 17 of the outlet box, and passing through openings 33 through the face plate portion of the receptacle. The outer wall of this face plate portion may be countersunk, as shown at 34, to receive the head of these securing screws or may be left plain if desired. The heads 35 of the screws shown in Figs. 1, 2 and 7 are preferably provided with radial ridges to facilitate tightening and loosening of the screws.

Referring to Figs. 8 to 14 inclusive I show in these figures a construction for a double receptacle. This double receptacle is secured to the outlet box 16 in the same manner as the single receptacle shown in Figs. 1 to 4, except that I have used the form of screw shown in Fig. 15, the head 35' of which is made of insulating material preferably molded from a phenolic condensation product the same as is the body and face plate portions of the receptacle. This head is also provided with a slot 35" for a screw driver but this slot preferably does not run through the sides of the head and so the sides thereof are less liable to break or chip. In this receptacle as illustrated the body portion 36 and face plate portion 37 are molded in one piece and of insulating material, but it may be made in two pieces secured together, the same as the single receptacle, this material being preferably a phenolic condensation product such as condensite, bakelite, redmanol or the like. The face plate portion is provided with two sets of openings 38 and 39, leading from the surface thereof to the chambers 40 communicating with the recesses 41 in the back of the body portion. Secured in these chambers are the spring contact blades or fingers 42, and the openings 38 and 39 are for the insertion of the contact blades carried by the standard caps to form electrical connection with the blades 42. The contact plates 43, of which the contact fingers 42 are a part, are seated on the bottom of the recesses 41 and are secured therein by a securing plate 44, carrying binding post screw 45 with which the lead wires 46 are connected. This securing plate is placed on the top of a contact plate and clamped thereagainst by suitable securing pins 47 which pins are preferably molded in the body member, extend through openings in plates 43 and 44 and are riveted over against the outer surface of the securing plate. The corresponding fingers 42 of the two receptacles are mounted on the same contact plate 43 so it will be apparent there are but two contact plates and two securing plates in the receptacle, and the two contact plates are alike as are also the two securing plates.

It will thus be apparent that the receptacle is very simple in construction and comprises but very few parts which are simple. The receptacle will, therefore, be easy to assemble and comparatively cheap to manufacture, and will also be very reliable in operation. After the contacts are secured in position the recesses 20 and 41 may be filled with insulating wax in the usual manner.

As the body portion, the face plate portion, and the means for securing the face plate portion to the outlet box are all composed of insulating material and electrically non-conducting, there will be no danger of the operator receiving a shock from contact with any of these elements should any of the connections become loosened, especially those of the lead wires and allow them to come in contact with the plate or the outlet box. In other words this construction and arrangement provides a dead front installation. The phenolic condensation product may also be finished in various surfaces and colors, making a very attractive plate and one which may be easily cleaned as the surface may be wiped off with a damp cloth without marring its finish in any way. It will also be apparent that the operation of installing the receptacle, or other electrical device, as the case may be, is much simpler and quicker than that of similar devices now generally employed where the body portion or mounting for the contacts is mounted separately from and independently of the face plate, as this latter construction requires a separate support as a yoke with two sets of screws. This also provides a greater number of elements to become loosened and get out of order in operation. Further the receptacle and face plate being a complete unit whether molded in one piece or molded in two pieces secured together, it is not necessary to make adjustments in installing the same as in the old construction as by using washers and the like, to bring the switch or receptacle in proper relationship to the plate. It being a complete unit it is necessary merely to tighten up on the screws until the flange of the face plate portion rests against the surface of the walls.

Having thus set forth the nature of my invention, what I claim is:

1. In combination an outlet box adapted to be mounted in a wall, an electric device including a face plate of insulating material having walls extending rearwardly from the inner face thereof also of insulating material and molded in one piece with said face plate, electrical contacts mounted directly on said walls, and means for securing said device to the outlet box comprising one or more screws passing through the plate to secure the device as a unit to the outlet box and having heads of insulating material exposed at the front of the plate to provide with the plate a dead front installation.

2. A wall outlet of the multiple receptacle type comprising, a plate of insulation forming an outlet box cover and provided with a plurality of plug-in receptacle slots made therethrough, contact blades disposed and held within the receptacle slots, a housing of insulation material on the back of the plate and surrounding each contact blade, and a circuit bar disposed to the rear of the housing and connected with the contact blades.

3. An electrical wall outlet device adapted to supply current to a plurality of jack blade plug cap connections, comprising in combination, a wall finish insulation plate, housing means of insulation formed integrally on the rear face thereof, contact blades mounted in spaced pairs in the housing means, a pair of circuit bars anchored to the housing means and connected with said contact blades, and said plate provided with receptacle slots made therethrough arranged in spaced pairs reaching to the housing means and to the contact blades.

4. An electrical outlet assembly limited to a two-part combination for ordinary house wiring, a box to receive feed-wire terminals, a flat plate of insulation material disposed over the box and forming a suitable thin cover therefor, an insulation boss carried on the rear face of the insulation plate, said insulation plate and boss being provided with spaced receptacle slots opening thru the outer face of the plate, electrical contact means mounted in the slots back of the flat plate, and feed-wire connection means to attach wire terminals to the electrical contact means.

5. An electrical outlet receptacle comprising a flat insulation cover plate having a flat front and rear face and adapted to be disposed over a box and be insulated therefrom, an insulation boss carried on the rear face of the plate, said insulation plate and boss being provided with duplex receptacle slots therein which open straight thru and perpendicular to the face of the plate and thus afford a plural electrical outlet, contact means in the slots adapted to be engaged by contact blades on a removable plug cap, and clamp-screw means by which terminal wires may be attached to the contact means.

6. An electrical outlet comprising an insulation plate forming a thin flat cover for outlet boxes and made with plug-in electrical receptacle slots which open perpendicularly thru said flat cover, a boss of insulation material carried on the rear face of the insulation plate and also made with plug-in receptacle slots which form a continuation of the first named slots, contact means housed in the boss behind the plate including a contact blade mounted in each slot to the rear of the flat cover, and wire connection means carried on the boss of insulation and connected with the contact means.

In testimony whereof I affix my signature.

TONJES A. BOTH.